United States Patent
Kim et al.

(10) Patent No.: US 7,027,114 B2
(45) Date of Patent: Apr. 11, 2006

(54) ARRAY SUBSTRATE FOR LIQUID CRYSTAL DISPLAY DEVICE AND METHOD OF MANUFACTURING THE SAME

(75) Inventors: Jeong Hyun Kim, Gunpo-shi (KR); Sam Yeoul Kim, Osan-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 71 days.

(21) Appl. No.: 10/847,370

(22) Filed: May 18, 2004

(65) Prior Publication Data

US 2005/0001966 A1    Jan. 6, 2005

(30) Foreign Application Priority Data

May 23, 2003    (KR) .................... P10-2003-0032958

(51) Int. Cl.
G02F 1/1335    (2006.01)

(52) U.S. Cl. ...................................... 349/106

(58) Field of Classification Search ................ 349/106, 349/43

See application file for complete search history.

(56) References Cited

U.S. PATENT DOCUMENTS

| | | | |
|---|---|---|---|
| 6,365,916 B1 * | 4/2002 | Zhong et al. ................ | 349/106 |
| 6,628,366 B1 * | 9/2003 | Wu et al. ..................... | 349/106 |
| 6,630,274 B1 * | 10/2003 | Kiguchi et al. .............. | 349/106 |
| 6,727,964 B1 * | 4/2004 | Tanaka et al. ............... | 349/106 |
| 6,731,358 B1 * | 5/2004 | Tanaka et al. ............... | 349/108 |
| 6,847,422 B1 * | 1/2005 | Zhang et al. ................ | 349/106 |
| 6,850,291 B1 * | 2/2005 | Song ............................ | 349/43 |
| 6,866,917 B1 * | 3/2005 | Song ........................... | 349/106 |
| 2002/0033912 A1 * | 3/2002 | Tanaka et al. ............... | 349/106 |

* cited by examiner

*Primary Examiner*—James A. Dudek
(74) *Attorney, Agent, or Firm*—McKenna Long & Aldridge LLP

(57) ABSTRACT

An array substrate for and LCD device and a method of manufacturing the same is disclosed, to improve an aperture ratio with a simplified manufacturing process, which includes gate and data lines crossing each other on an insulating substrate to define a pixel region; a thin film transistor including a gate electrode and source and drain electrodes where the gate and data lines cross; a color filter formed on the source and drain electrodes and the pixel region, and having a contact hole exposing a predetermined portion of the drain electrode; and a pixel electrode on the color filter to be connected with the drain electrode through the contact hole.

13 Claims, 7 Drawing Sheets

ND METHOD OF
ARRAY SUBSTRATE FOR LIQUID CRYSTAL DISPLAY DEVICE AND METHOD OF MANUFACTURING THE SAME

This application claims the benefit of the Korean Patent Application No. P2003-32958, filed on May 23, 2003, which is hereby incorporated by reference for all purposes as if fully set forth herein.

BACKGROUND OF THE INVENTION

1. Field of the Invention

The present invention relates to a liquid crystal display (LCD) device, and more particularly, to an array substrate for an LCD device and a method of manufacturing the same to obtain a simplified manufacturing process.

2. Discussion of the Related Art

With the development of the information society, demand for various flat display devices having advantageous characteristics such as a thin profile, light weight, and low power consumption have increased. Among the various flat display devices, LCD devices having high resolution and high picture quality are applied for monitors of notebook and desktop computers.

In general, the LCD device includes lower and upper substrates facing each other. Respective surfaces of the two substrates having electrodes thereon are opposite to each other. Liquid crystal material is injected between the two substrates, and then liquid crystal molecules are driven according to an electric field generated by applying a voltage to the two electrodes of the respective substrates. Accordingly, it is possible to control light transmittance through the liquid crystal material by the electric field, thereby producing images.

The lower substrate of the LCD device is an array substrate including a thin film transistor for applying a signal to a pixel electrode. The lower substrate is formed by photolithography. Meanwhile, the upper substrate includes a color filter sequentially arranging red, green and blue colors, and a common electrode. The upper substrate is formed by a pigment dispersion method, a dye method, or a print method. In particular, the pigment dispersion method is most often used due to fineness and exceptional color realization.

The LCD device has an array substrate (lower substrate) and a color filter substrate (upper substrate), wherein the pixel electrode of the lower substrate is in one-to-one correspondence with the color filter of the upper substrate. When arranging the lower and upper substrates, there may be misalignment, thereby generating light leakage. In order to prevent this problem, the width of a black matrix formed on the upper substrate must be increased. However, doing so may lower the aperture ratio in the LCD device. Accordingly, a method of forming the color filter on the array substrate is proposed to prevent misalignment and to improve the aperture ratio in the LCD device. This method of forming the color filter on the thin film transistor is referred to as a COT (color filter on TFT) structure.

Hereinafter, an array substrate for an LCD device having a COT structure according to the related art and a method of manufacturing the same will be described as follows.

FIG. 1 is a cross-sectional view illustrating an array substrate for an LCD device having a COT structure therein according to the related art. As shown in FIG. 1, a gate electrode 12 is formed on a transparent first substrate 11. The gate electrode 12 is formed of a conductive material such as metal. Then, a gate insulating layer 13 of silicon nitride $SiN_x$ or silicon oxide $SiO_2$ is formed on the transparent first substrate 11 including the gate electrode 12. Subsequently, an active layer 14 of amorphous silicon is formed on the gate insulating layer 13 above the gate electrode 12. Then, an ohmic contact layer 15 of amorphous silicon doped with an impurity is formed thereon. Source and drain electrodes 16a and 16b are formed overlapping with both sides of the ohmic contact layer 15. The source and drain electrodes 16a and 16b of conductive material such as metal are formed at a predetermined interval from each other. At this time, a thin film transistor T is formed of the source and drain electrodes 16a and 16b and the gate electrode 12.

Although not shown, the gate electrode 12 is connected to a gate line, and the source electrode 16a is connected to a data line. Also, the gate and data lines cross each other to define a pixel region. Then, a passivation layer 17 is formed on an entire surface of the first substrate 11 including the source and drain electrodes 16a and 16b to protect the thin film transistor T. At this time, the passivation layer 17 is formed of silicon nitride, silicon oxide, or an organic insulating layer. Next, a color filter layer 18 is formed in the pixel region on the passivation layer 17, wherein the color filter layer 18 is formed by sequentially arranging red, green and blue colors. At this time, a contact hole 19 for exposing a predetermined portion of the drain electrode 16b is formed in the color filter layer 18 and the passivation layer 17. After that, a pixel electrode 20 of transparent conductive material is formed on the color filter layer 18. The pixel electrode 20 is electrically connected with the drain electrode 16b through the contact hole 19.

In the meantime, a transparent second substrate 21 is positioned above the transparent first substrate 11 at a predetermined interval. On a surface of the second substrate 21 facing the first substrate 11, there is a black matrix layer 22 corresponding to the thin film transistor T of the first substrate 11. Although not shown, the black matrix layer 22 has an opening corresponding to the pixel electrode 20 of the first substrate 11. Accordingly, the black matrix layer 22 blocks light from regions except the pixel regions of the first substrate 11. That is, the black matrix layer 22 prevents light leakage as liquid crystal molecules are tilted. In addition, the black matrix layer 22 prevents a leakage current in the thin film transistor T. Then, a common electrode 23 of conductive material is formed on an entire surface of the second substrate 21 including the black matrix layer 22. After that, a liquid crystal layer 30 is formed between the pixel electrode 20 and the common electrode 23. When voltage is applied between the pixel electrode 20 and the common electrode 23, the alignment direction of the liquid crystal molecules in the liquid crystal layer 30 is changed by an electric field generated between the pixel electrode 20 and the common electrode 23. Although not shown, alignment layers are formed on the common electrode 23 and the pixel electrode 20, so as to determine the initial alignment of the liquid crystal molecules.

Accordingly, when the color filter layer 18 is formed on the first substrate (lower substrate) 11, it is possible to prevent misalignment between the color filter layer 18 and the pixel electrode 20. Thus, the aperture ratio may be improved without increasing a width of the black matrix layer 22. Also, the color filter layer 18, formed on the first substrate 11, makes it possible to prevent misalignment between the color filter layer 18 and the pixel electrode 20 when bonding the first and second substrates 11 and 21 to each other. That is, it is possible to decrease a bonding margin of the black matrix layer 22 of the second substrate 21. If the barrier pattern is formed of a black matrix material preventing light transmittance, it is possible to omit the black matrix layer 22 of the second substrate 21, thereby improving the aperture ratio.

FIG. 2A to FIG. 2E are cross-sectional views illustrating manufacturing process steps of the array substrate for the LCD device according to the related art. The color filter layer is formed by the pigment dispersion method.

First, as shown in FIG. 2A, the metal material is deposited on the transparent first substrate 11, and then is selectively removed by photolithography using a first mask, thereby forming the gate electrode 12. When forming the gate electrode 12, the gate line (not shown) connected to the gate electrode 12 is formed in a first direction. Subsequently, the insulating material, such as silicon nitride or silicon oxide, is deposited on the entire surface of the first substrate 11 including the gate electrode 12, thereby forming the gate insulating layer 13. Then, the amorphous silicon layer and an amorphous silicon layer doped with an impurity are sequentially formed on the gate insulating layer 13, and then selectively removed by photolithography using a second mask, thereby forming the active layer 14 and the ohmic contact layer 15.

As shown in FIG. 2B, the metal material is deposited on the entire surface of the first substrate 11, and then selectively removed by photolithography using a third mask, thereby forming the source and drain electrodes 16a and 16b overlapped with both sides, of the ohmic contact layer 15 at a predetermined interval from each other. The data line (not shown) is simultaneously formed with the source and drain electrodes 16a and 16b, the data line extending from the source electrode 16a in a second direction. The data line is substantially perpendicular to the gate line, thereby defining the pixel region. Then, the ohmic contact layer 15 exposed by the source and drain electrodes 16a and 16b is selectively removed. At this time, the source and drain electrodes 16a and 16b are formed at a predetermined interval from each other to form a channel region. As a result, the thin film transistor T includes the source and drain electrodes 16a and 16b and the gate electrode 12.

As shown in FIG. 2C, the passivation layer 17 of silicon nitride, silicon oxide, or organic insulating layer is formed on the source and drain electrodes 16a and 16b. If the passivation layer 17 is formed of the organic insulating layer, a step difference generated by the thin film transistor T is removed to obtain smoothness and easiness in the following manufacturing process steps.

As shown in FIG. 2D, a photosensitive material is formed on the passivation layer 17, and then exposure and pattering process is performed thereto, thereby forming the color filter layer 18 in the pixel region. The color filter layer 18 and the passivation layer 17 are selectively removed on the drain electrode 16b, thereby forming the contact hole 19 exposing a predetermined portion of the drain electrode 16b. The color filter layer 18 is formed of red, green and blue colors, whereby the color filter layer 18 with various colors is formed by repeating deposition and exposure and developing process three times.

As shown in FIG. 2E, a transparent conductive material is deposited on the color filter layer 18, and then patterned, whereby the pixel electrode 20 is formed for being electrically connected with the drain electrode 16b through the contact hole 19.

However, the method of manufacturing the array substrate for the LCD device according to the related art has the following disadvantages.

If the color filter layer is formed by repetition of the exposure and developing process a number of times after deposition of the photosensitive material, it requires increased time to form the color filter layer. Also, in order to form the color filter layer, the photosensitive material is formed on the entire surface of the substrate by a spin-coating method, and then partially removed, thereby increasing consumption of materials. On the exposure and developing process after deposition of the photosensitive material, elements of impurity or developer of the photosensitive material may penetrate into the adjacent layer, whereby it may deteriorate characteristics of the thin film transistor. In order to prevent this problem, it is required to form the passivation layer on the thin film transistor.

SUMMARY OF THE INVENTION

Accordingly, the present invention is directed to an array substrate for an LCD device and a method of manufacturing the same that substantially obviates one or more problems due to limitations and disadvantages of the related art.

An advantage of the present invention is to provide an array substrate for an LCD device and a method of manufacturing the same to improve an aperture ratio with a simplified manufacturing process.

Additional advantages, of the invention will be set forth in part in the description which follows and in part will become apparent to those having ordinary skill in the art upon examination of the following or may be learned from practice of the invention. The advantages of the invention may be realized and attained by the structure particularly pointed out in the written description and claims hereof as well as the appended drawings.

To achieve these advantages and in accordance with the purpose of the invention, as embodied and broadly described herein, an array substrate for an LCD device includes gate and data lines crossing each other on an insulating substrate to define a pixel region; a thin film transistor including a gate electrode and source/drain electrodes at a crossing portion of the gate and data lines; a color filter formed on the source/drain electrodes and the pixel region, and having a contact hole exposing a predetermined portion of the drain electrode; and a pixel electrode on the color filter to be connected with the drain electrode through the contact hole.

The pixel electrode may be formed of a transparent conductive material. Also, the transparent conductive material may be indium-tin-oxide or indium-zinc-oxide.

In another aspect, a method of manufacturing an array substrate for an LCD device includes the steps of forming a gate line and a gate electrode extending therefrom on an insulating substrate; sequentially forming a gate insulating layer, a semiconductor layer and a metal layer on the insulating substrate including the gate electrode; depositing a photoresist on the metal layer, and forming a photoresist pattern having different thickness therein by performing diffraction exposure and developing process to the photoresist; selectively removing the metal layer, the semiconductor layer, and the gate insulating layer by using the photoresist pattern as a mask; ashing the photoresist pattern; forming a data line perpendicular to the gate line for defining a pixel region, a source electrode extending from the data line, and a drain electrode formed at a predetermined interval from the source electrode by selectively removing the metal layer using the ashed photoresist pattern as a mask; depositing a photosensitive film on the insulating substrate having the source and drain electrodes thereon, and forming a color filter having a contact hole exposing a predetermined portion of the drain electrode in a thermal print method; and forming a pixel electrode above the color filter to be connected with the drain electrode through the contact hole.

The thermal print method may use a laser beam.

Also, the method of forming the color filter may include the steps of forming the photosensitive film on the insulating substrate; irradiating a laser beam to a predetermined portion of the photosensitive film corresponding to the pixel electrode; and printing a predetermined portion of the photosensitive film having a laser beam irradiated thereto on the insulating substrate.

Furthermore, the method may include forming an overcoat layer on the color filter after forming the color filter. The overcoat layer may be formed of an organic insulating layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention.

In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Hereinafter, an array substrate for an LCD device according to the present invention and a method of manufacturing the same will be described with reference to the accompanying drawings.

Figure 1:
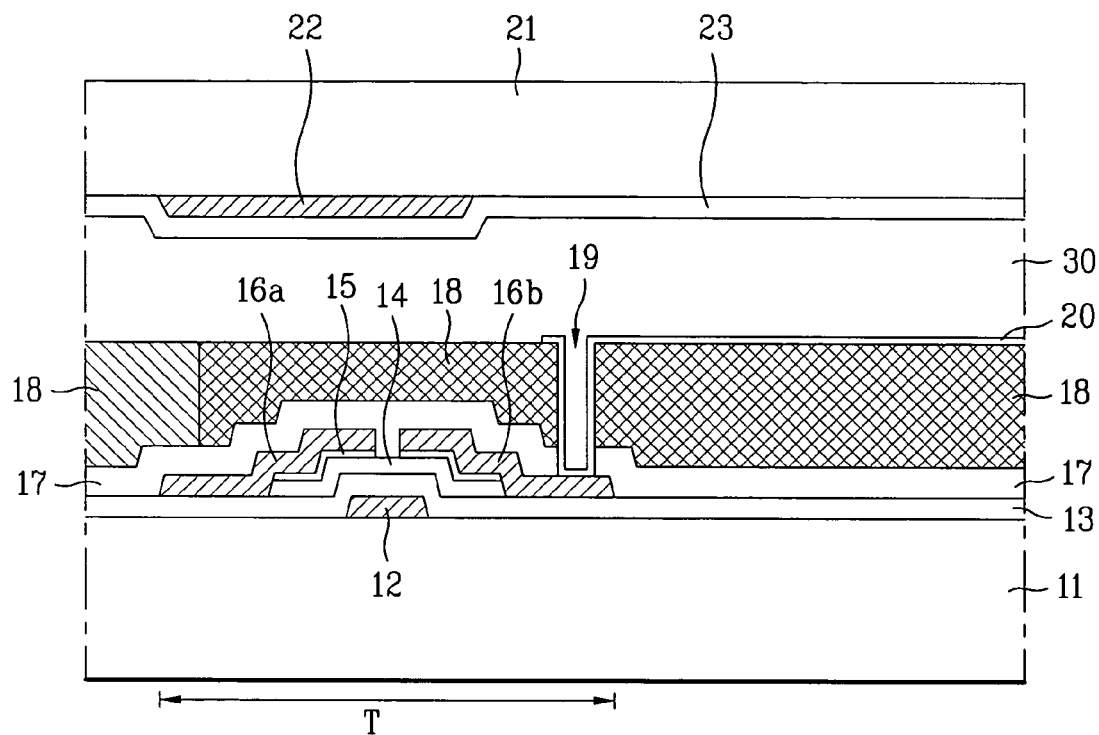
FIG. 1 is a cross-sectional view illustrating an array substrate for an LCD device having a COT structure therein according to the related art.
Figure 2A:
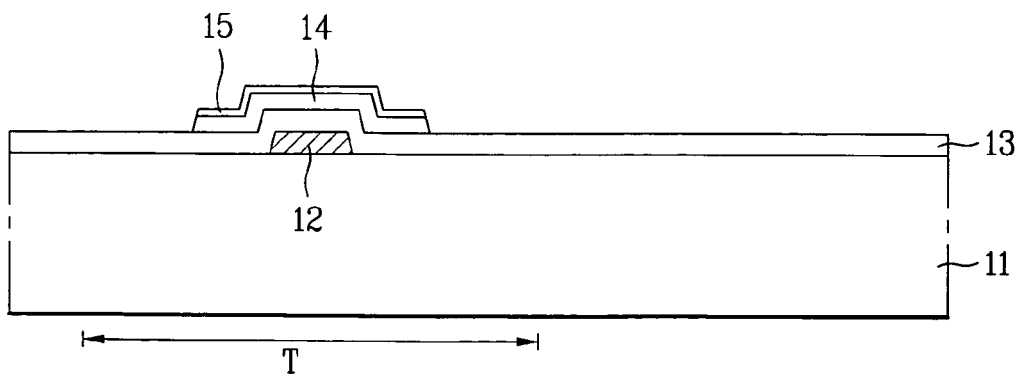
FIG. 2A to FIG. 2E are cross-sectional views illustrating manufacturing process steps of an array substrate for an LCD device according to the related art.
Figure 2B:
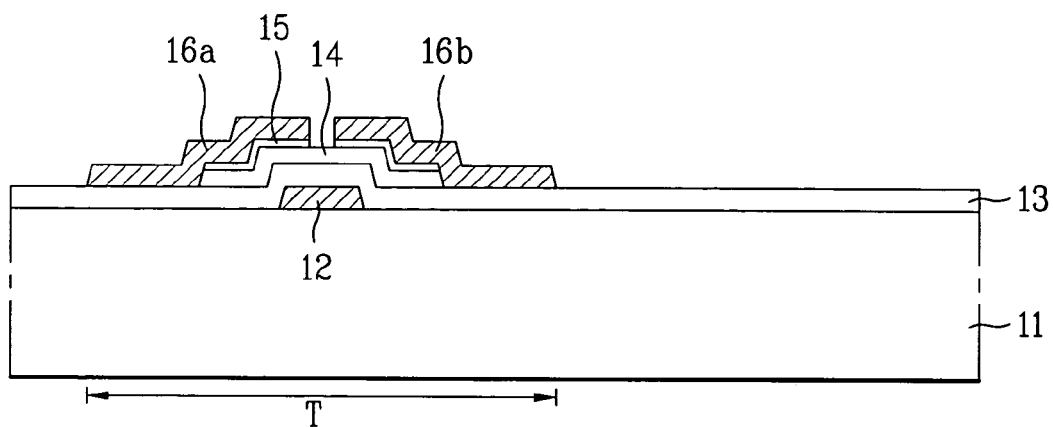
Figure 2C:
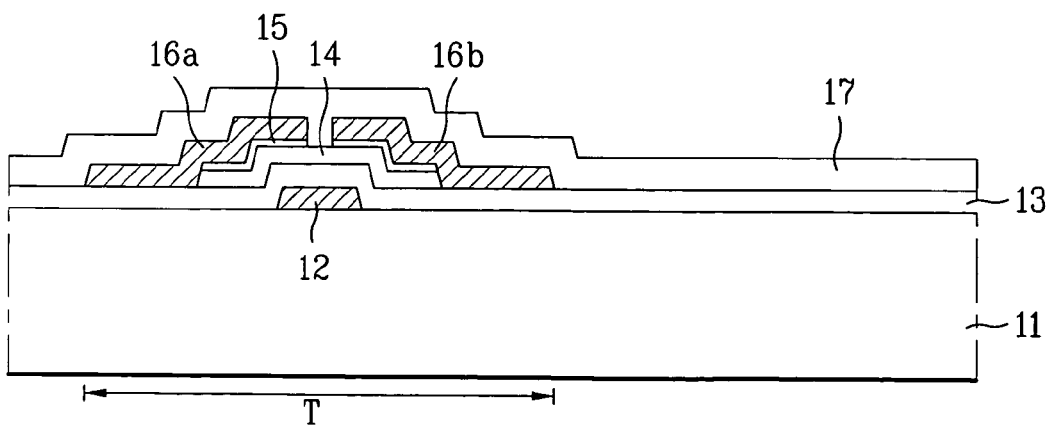
Figure 2D:
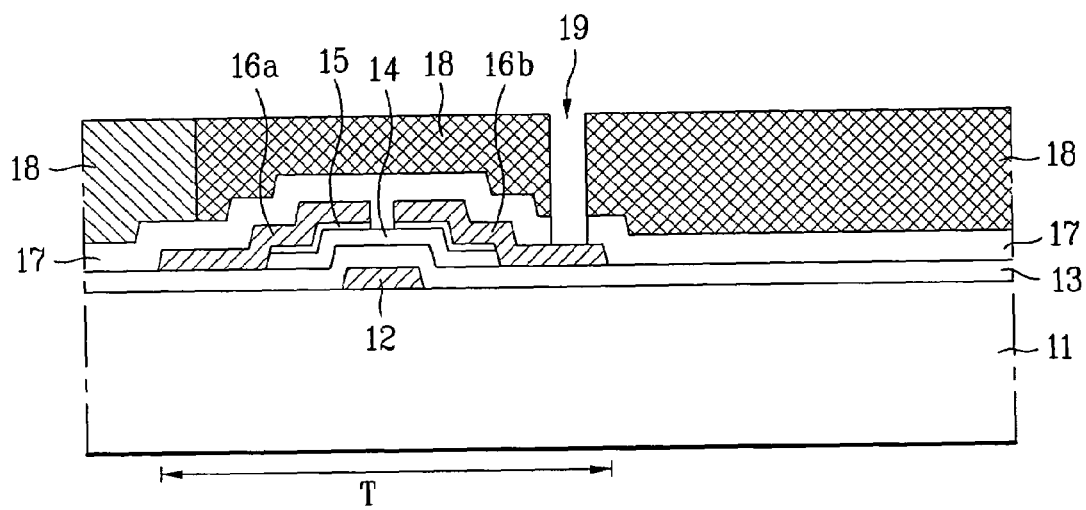
Figure 2E:
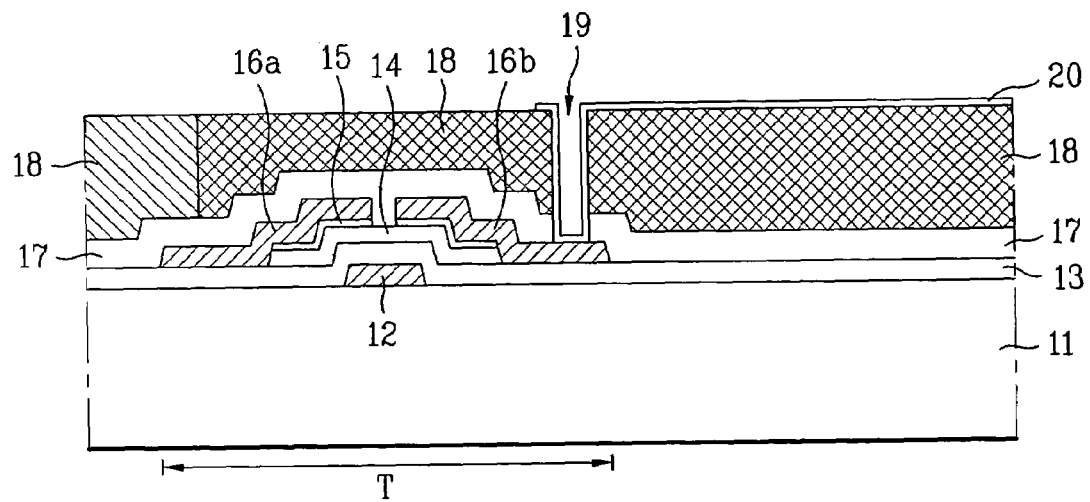
Figure 3:
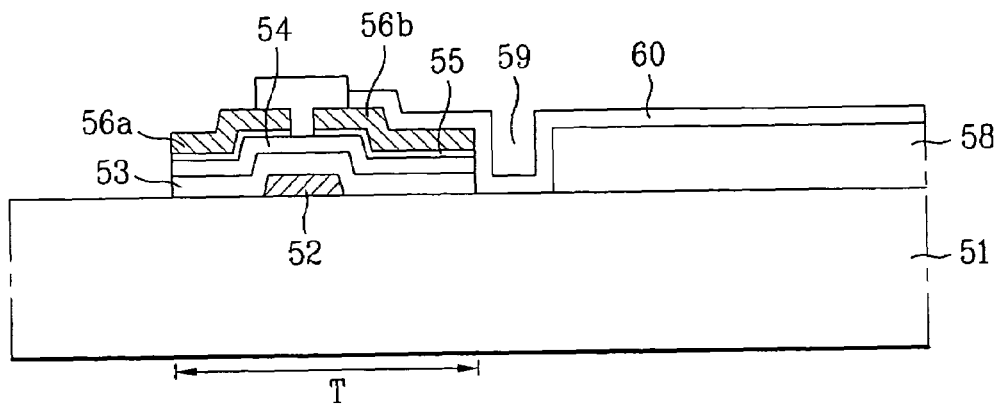
FIG. 3 is a cross-sectional view illustrating an array substrate for an LCD device having a COT structure therein according to an exemplary embodiment of the present invention.

FIG. 3 is a cross-sectional view illustrating an array substrate for an LCD device having a COT structure therein according to an exemplary embodiment of the present invention. As shown in FIG. 3, a gate line (not shown) of a conductive material such as metal is formed on a transparent insulating substrate 51 in a first direction, and a gate electrode 52 extends from the gate line (not shown). Then, a gate insulating layer 53 is formed on an entire surface of the transparent insulating substrate 51 including the gate electrode 52. At this time, the gate insulating layer 53 is formed of silicon nitride or silicon oxide.

Subsequently, an active layer 54 of amorphous silicon is formed on the gate insulating layer 53 above the gate electrode 52. Also, an ohmic contact layer 55 of amorphous silicon doped with an impurity is formed on the active layer 54. The active layer 54 and the ohmic contact layer 55 may be expressed as a semiconductor layer. Then, a conductive layer of metal is formed on the ohmic contact layer 55, and a data line (not shown) is formed substantially perpendicular to the gate line to define a pixel region. Also, a source electrode 56a extends from the data line, and a drain electrode 56b is formed opposite to the source electrode 56a. As a result, a thin film transistor T is formed of the source and drain electrodes 56a and 56b and the gate electrode 52.

A color filter layer 57 is formed on the source and drain electrodes 56a and 56b. The color filter layer 57 has a contact hole 59 for partially exposing the drain electrode 56b. The color filter layer 57 is formed on the data line to produce various colors by sequential arrangement of red, green and blue colors. A pixel electrode 60 of a transparent conductive material is formed on the color filter layer 57 to be one-to-one correspondence with the color filter layer 57. The pixel electrode 60 is connected with the drain electrode 56b through the contact hole 59.

In the array substrate for the LCD device according to the present invention, a thermal print method is used to print corresponding portions on the substrate by laser beam. The thermal print method is a simplified process as compared to the related art method for forming a color filter layer by deposition of photosensitive material and subsequent exposure and developing processes.

A method of manufacturing the array substrate for the LCD device having the color filter layer formed by the thermal print method will be described with reference to FIG. 4A to FIG. 4G. FIG. 4A to FIG. 4G are cross-sectional views illustrating the array substrate for the LCD device according to the preferred embodiment of the present invention.

Figure 4A:
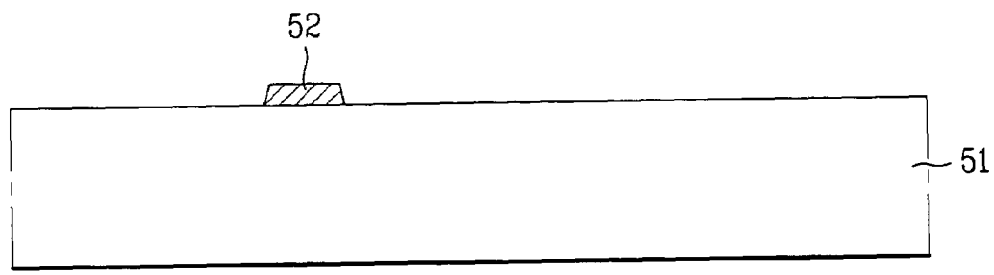
FIG. 4A to FIG. 4G are cross-sectional views illustrating manufacturing process steps of an array substrate for an LCD device according to the preferred embodiment of the present invention.

As shown in FIG. 4A, the conductive material of metal is deposited on the transparent insulating substrate 51 by sputtering, and then selectively removed by photolithography, thereby forming the gate electrode 52. Simultaneously, the gate line (not shown) connected with the gate electrode 52 and having the first direction is formed on the transparent insulating substrate 51. The conductive material is formed of any one or alloy of aluminum Al, aluminum alloy AlNd, chrome Cr, tungsten W, and molybdenum Mo. The material of the gate electrode 52 has great effects on operation of the LCD device. To decrease RC delay, the gate electrode 52 is formed of aluminum Al having a low resistance. However, if the gate electrode is formed of pure aluminum Al, it leads to defects in the lines due to hillocks generated during the heat treatment of high temperature because pure aluminum has bad corrosion resistance. In this respect, it is general to apply the aluminum alloy or deposition structure.

Figure 4B:
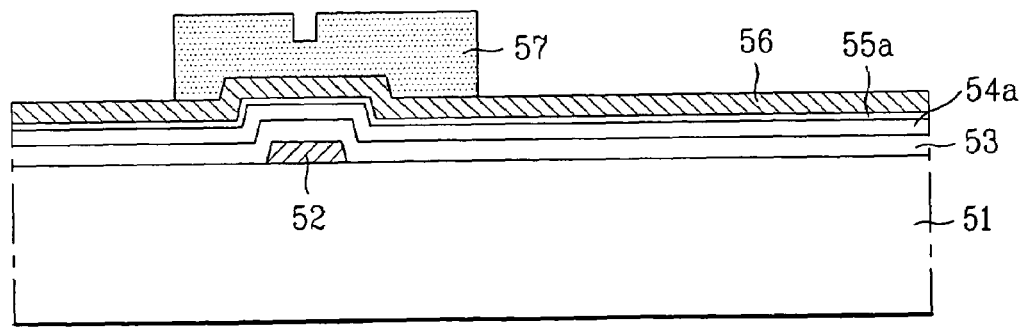

As shown in FIG. 4B, the gate insulating layer 53, the amorphous silicon layer 54a and the amorphous silicon layer doped with an impurity 55a are sequentially deposited on the transparent insulating substrate 51 including the gate electrode 52. The gate insulating layer 53 is formed of an inorganic insulating material such as silicon oxide or silicon nitride, or an organic insulating material such as BenzoCycloButene (BCB) or acrylic resin by a chemical vapor deposition (CVD) method. Next, the metal layer 56 is deposited on the amorphous silicon layer doped with an impurity 55a by the CVD method or sputtering. After depositing a photoresist on the metal layer 56, a photoresist pattern 57 is formed by the exposure and developing process using a diffraction mask. The diffraction mask is comprised of a closed region excluding light completely, a transmission region transmitting light, and a slit region transmitting light at a predetermined amount. Accordingly, the developed photoresist pattern 57 has different thickness therein.

Figure 4C:
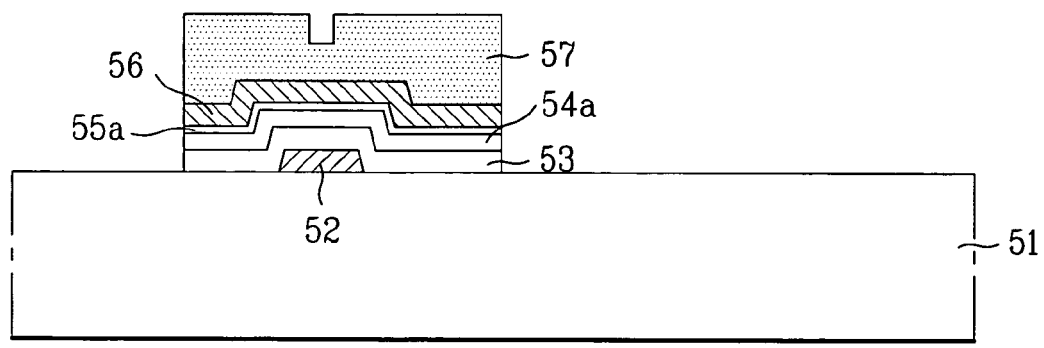

As shown in FIG. 4C, the metal layer 56, the amorphous silicon layer doped with an impurity 55a and the amorphous silicon layer 54a are selectively removed in wet or dry etching method by using the photoresist pattern 57 as a mask.

Figure 4D:
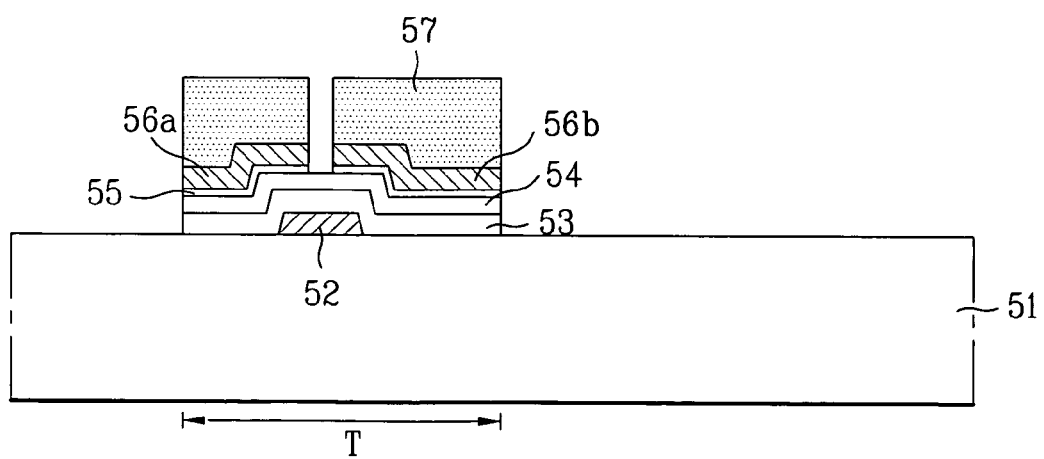

As shown in FIG. 4D, a predetermined portion of the photoresist pattern 57 is selectively removed by $O_2$ ashing, a predetermined portion being relatively thin. Also, the remaining photoresist pattern 57 becomes thin. Subsequently, the metal layer 56 corresponding to a channel region of the thin film transistor and the amorphous silicon layer doped with an impurity 55a are selectively etched using the ashed photoresist pattern 57 as a mask, thereby forming the source electrode 56a, the drain electrode 56b, the ohmic contact layer 55 and the active layer 54. The data line (not shown) connected with the source electrode 56a and having a second direction is formed perpendicular to the gate line, thereby defining the pixel region. Meanwhile, the thin film transistor T is comprised of the source and drain electrodes 56a and 56b and the gate electrode 52.

Figure 4E:
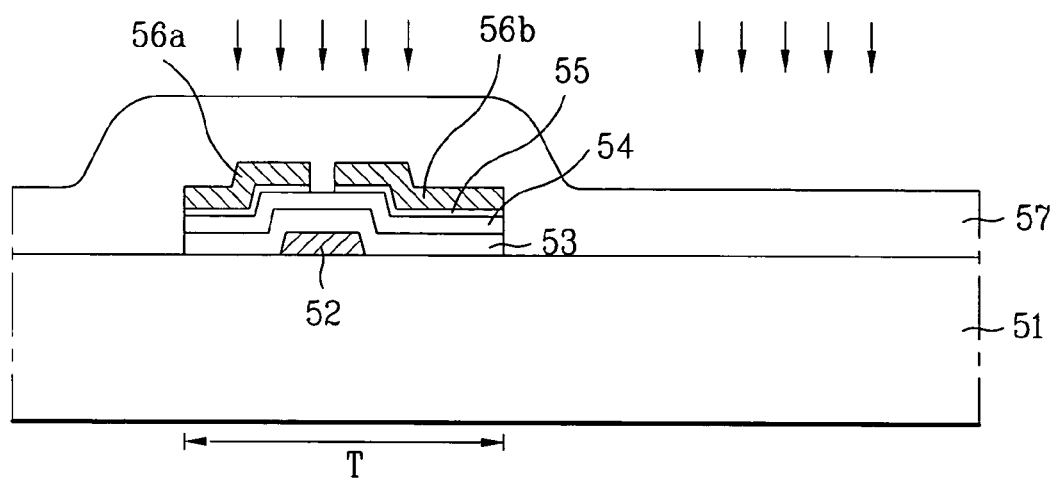
Figure 4F:
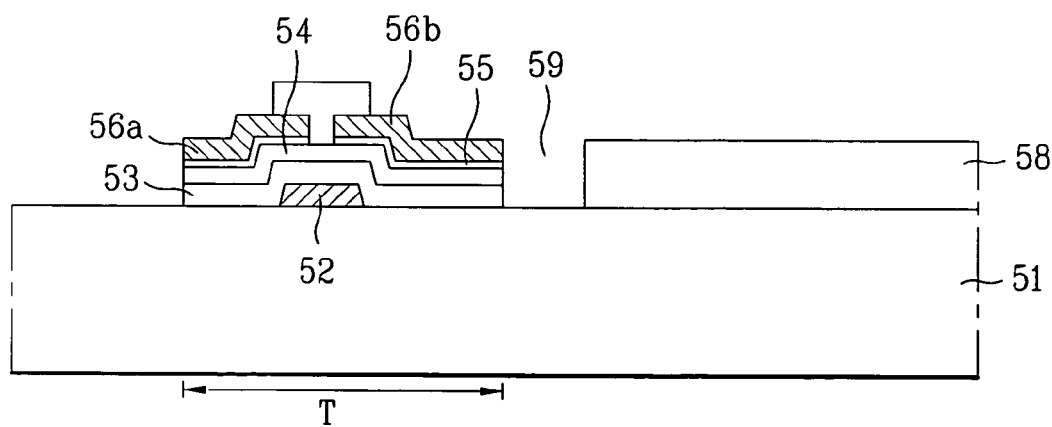

As shown in FIG. 4E, after partially removing the photoresist pattern 57, a Red photosensitive film 58a is deposited on the entire surface of the transparent insulating substrate 51 including the source and drain electrodes 56a and 56b. Then, a laser beam is momentarily irradiated to the source and drain electrodes 56a and 56b and the first pixel region, whereby the portion having the laser beam irradiated thereto is printed on the transparent insulating substrate 51 forming the thin film transistor T therein. At this time, as shown in FIG. 4F, a predetermined portion of the drain electrode 56 is not exposed by laser beam, thereby forming the color filter layer 58 having the contact hole 59 therein. In order to form the color filter layer 58, after forming green and blue photosensitive films sequentially, laser beam is momentarily irradiated thereon, whereby green and blue color filters are respectively formed in the second pixel region and the third pixel region.

Figure 4G:
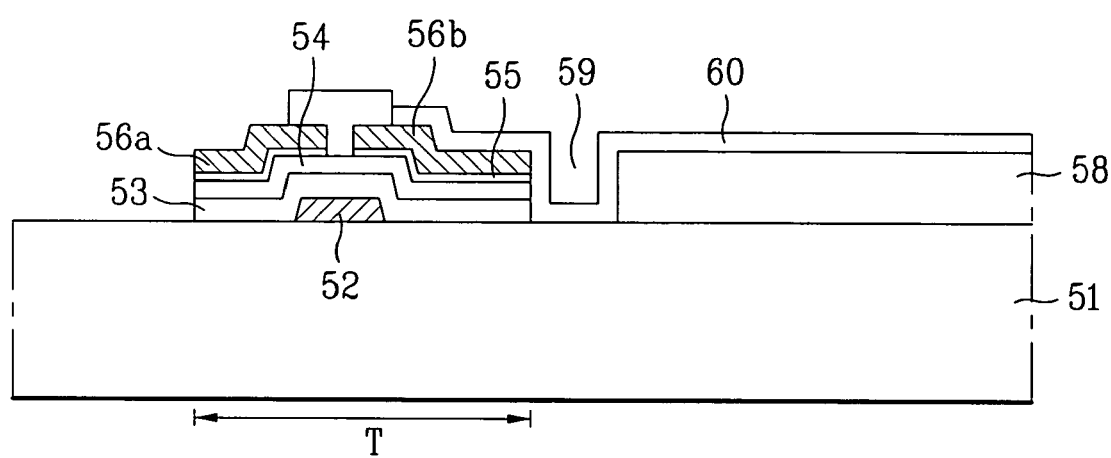

As shown in FIG. 4G, a transparent conductive material of indium-tin-oxide or indium-zinc-oxide is deposited on the entire surface of the transparent insulating substrate 51 including the contact hole 59, and then patterned, thereby forming the pixel electrode 60 connected with the drain electrode 56b through the contact hole. At this time, before forming the pixel electrode 60, an overcoat layer (not shown) of organic insulating material may be formed on the color filter layer 58. The organic insulating material may be any one of acrylic resin, polyimide, BenzoCycloButene (BCB), oxide layer, and nitride layer.

As mentioned above, the array substrate for the LCD device according to the present invention and the method of manufacturing the same has the following advantages.

In order to improve the aperture ratio, the thermal print method using laser beam is used to form the color filter layer on the array substrate, thereby simplifying the manufacturing process.

Also, the color filter layer is a film-type having no fluidity, and does not require the exposure and developing process to be performed thereto. That is, it is possible to prevent foreign materials from penetrating into the color filter layer without forming the additional passivation layer, thereby simplifying the manufacturing process, and improving reliability of the thin film transistor.

Furthermore, the color filter layer serves as a flattening layer for removing a step transition in the thin film transistor.

In this respect, it is possible not to form the additional passivation layer, whereby the manufacturing process is smoothly carried out with easiness. By omitting the passivation layer, it is possible to simplify the manufacturing process and to improve reliability of the thin film transistor.

In addition, the source and drain electrodes, the active layer and the ohmic contact layer are simultaneously formed by diffraction exposure using one mask, thereby simplifying the manufacturing process.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of manufacturing an array substrate for an LCD device comprising:
    forming a gate line and a gate electrode extending therefrom on an insulating substrate;
    sequentially forming a gate insulating layer, a semiconductor layer and a metal layer on the insulating substrate including the gate electrode;
    depositing a photoresist on the metal layer, and forming a photoresist pattern having different thickness therein by performing diffraction exposure and developing process to the photoresist;
    selectively removing the metal layer, the semiconductor layer, and the gate insulating layer by using the photoresist pattern as a mask;
    ashing the photoresist pattern;
    forming a data line substantially perpendicular to the gate line to define a pixel region, a source electrode extending from the data line, and a drain electrode formed at a predetermined interval from the source electrode by selectively removing the metal layer using the ashed photoresist pattern as a mask;
    depositing a photosensitive film on the insulating substrate having the source and drain electrodes thereon, and forming a color filter having a contact hole exposing a predetermined portion of the drain electrode in a thermal print method; and
    forming a pixel electrode above the color filter to be connected with the drain electrode through the contact hole.

2. The method of claim 1, wherein the thermal print method uses a laser beam.

3. The method of claim 1, wherein the method of forming the color filter comprises:
    forming the photosensitive film on the insulating substrate;
    irradiating a laser beam on a predetermined portion of the photosensitive film corresponding to the pixel electrode; and
    printing a predetermined portion of the photosensitive film having a laser beam irradiated thereto on the insulating substrate.

4. The method of claim 1, further comprising the step of forming an overcoat layer on the color filter after forming the color filter.

5. The method of claim 4, wherein the overcoat layer is formed of an organic insulating layer.

6. The method of claim 5, wherein the organic insulating layer is formed of any one of acrylic resin, polyimide, BCB, oxide layer and nitride layer.

7. The method of claim 1, wherein the pixel electrode is formed of a transparent conductive material.

8. The method of claim 7, wherein the transparent conductive material is indium-tin-oxide.

9. The method of claim 7, wherein the transparent conductive material is indium-zinc-oxide.

10. The method of claim 1, wherein the method of forming the photoresist pattern comprises:
depositing the photoresist on the gate insulating layer, the semiconductor layer and the metal layer sequentially deposited on the insulating substrate;
aligning a diffraction mask having a closed region, a slit region and a transmission region on the photoresist; and
forming the photoresist pattern having a different thickness therein by performing an exposure and developing process to the photoresist with the diffraction mask.

11. The method of claim 1, wherein $O_2$ ashing is performed on the photoresist pattern.

12. The method of claim 1, wherein the semiconductor layer is formed by sequentially depositing an amorphous silicon layer and an amorphous silicon layer doped with an impurity.

13. The method of claim 1, wherein the semiconductor layer is removed at a predetermined thickness when forming the source and drain electrodes by selectively removing the metal layer using the photoresist pattern as a mask.

* * * * *